US012037882B2

(12) United States Patent
Dunford et al.

(10) Patent No.: US 12,037,882 B2
(45) Date of Patent: Jul. 16, 2024

(54) EXTRACTION FROM A FORMATION WITH INDUCTION HEATING

(71) Applicant: JOSLYN ENERGY DEVELOPMENT INCORPORATED, Calgary (CA)

(72) Inventors: William George Dunford, Vancouver (CA); Ahmed Hamid Ehmida Sherwali, Vancouver (CA); Paul Jesper Jespersen, Calgary (CA); Mohammadmedhi Noroozi, Calgary (CA)

(73) Assignee: JOSLYN ENERGY DEVELOPMENT INCORPORATED, Calgary (CA)

( * ) Notice: Subject to any disclaimer, the term of this patent is extended or adjusted under 35 U.S.C. 154(b) by 0 days.

(21) Appl. No.: 18/002,902

(22) PCT Filed: May 10, 2021

(86) PCT No.: PCT/IB2021/053961

§ 371 (c)(1),
(2) Date: Dec. 22, 2022

(87) PCT Pub. No.: WO2021/260455

PCT Pub. Date: Dec. 30, 2021

(65) Prior Publication Data

US 2023/0212929 A1 Jul. 6, 2023

Related U.S. Application Data

(60) Provisional application No. 63/081,163, filed on Sep. 21, 2020, provisional application No. 63/042,778, filed on Jun. 23, 2020.

(51) Int. Cl.

*E21B 36/04* (2006.01)
*E21B 43/24* (2006.01)

(Continued)

(52) U.S. Cl.

CPC .......... *E21B 43/2401* (2013.01); *E21B 36/04* (2013.01); *H05B 6/365* (2013.01);

(Continued)

(58) Field of Classification Search

CPC .... E21B 36/04; E21B 36/005; E21B 43/2401; H05B 2214/03; H05B 6/365; H05B 6/44

See application file for complete search history.

(56) References Cited

U.S. PATENT DOCUMENTS 1,464,618 A * 8/1923 Fershing ................ E21B 36/04 219/537
1,516,836 A * 11/1924 Williamson ............ E21B 36/04 392/303

(Continued)

FOREIGN PATENT DOCUMENTS

CN 2200050 6/1995
CN 2276556 3/1998

(Continued)

OTHER PUBLICATIONS

PCT International Application No. PCT/US21/53961, International Search Report, dated Aug. 2, 2021, 3 pages.

*Primary Examiner* — Kenneth L Thompson
(74) *Attorney, Agent, or Firm* — DLA PIPER LLP (US)

(57) ABSTRACT

An example of an apparatus is provided. The apparatus includes a magnetic core to be inserted into a borehole to a formation. The apparatus further includes a first coil wound about the magnetic core. In addition, the apparatus includes a first current supply to generate a first current to run through the first coil. Furthermore, the apparatus includes a first controller to control the first current supply. The first controller is to oscillate the first current to generate a magnetic field in the formation. Heat is to be generated in the formation via induction.

17 Claims, 14 Drawing Sheets

(51) Int. Cl.
*H05B 6/36* (2006.01)
*H05B 6/44* (2006.01)
*E21B 47/017* (2012.01)

(52) U.S. Cl.
CPC .............. *H05B 6/44* (2013.01); *E21B 47/017* (2020.05); *H05B 2214/03* (2013.01)

(56) References Cited

U.S. PATENT DOCUMENTS

| | | | | | |
|---|---|---|---|---|---|
| 1,681,523 | A * | 8/1928 | Downey | E21B 36/04 392/492 |
| 1,761,227 | A * | 6/1930 | Pasley | E21B 36/04 392/480 |
| 1,776,997 | A * | 9/1930 | Downey | E21B 36/04 392/305 |
| 2,484,063 | A * | 10/1949 | Ackley | E21B 36/04 392/480 |
| 2,757,739 | A * | 8/1956 | Douglas | E21B 36/04 166/61 |
| 3,381,171 | A * | 4/1968 | Kienast | H05B 7/005 315/176 |
| 6,926,083 | B2 | 8/2005 | LaroVere | |
| 6,942,032 | B2 | 9/2005 | La Rovere et al. | |
| 7,036,593 | B2 | 5/2006 | LaroVere | |
| 7,165,607 | B2 | 1/2007 | La Rovere et al. | |
| 8,210,256 | B2 | 7/2012 | Bridges | |
| 8,408,294 | B2 | 4/2013 | Bridges | |
| 8,443,887 | B2 | 5/2013 | Parsche | |
| 8,960,291 | B2 * | 2/2015 | Parsche | E21B 43/2401 166/61 |
| 9,267,366 | B2 * | 2/2016 | Parsche | E21B 43/2401 |
| 9,822,638 | B2 * | 11/2017 | Fehr | G01N 33/24 |
| 2004/0084442 | A1 | 5/2004 | La Rovere | |
| 2004/0104045 | A1 | 6/2004 | LaroVere | |
| 2004/0149443 | A1 | 8/2004 | La Rovere et al. | |
| 2005/0274521 | A1 | 12/2005 | LaroVere | |
| 2005/0284636 | A1 | 12/2005 | La Rovere et al. | |
| 2007/0187089 | A1 | 8/2007 | Bridges | |
| 2012/0125608 | A1 | 5/2012 | Parsche | |
| 2012/0325459 | A1 | 12/2012 | Bridges | |
| 2018/0306004 | A1 | 10/2018 | Raglin | |
| 2018/0339324 | A1 * | 11/2018 | Reyes | H05B 6/36 |

FOREIGN PATENT DOCUMENTS

| | | |
|---|---|---|
| CN | 2331759 | 8/1999 |
| CN | 2407120 | 11/2000 |
| CN | 106837280 | 6/2017 |
| CN | 212535612 | 2/2021 |
| FR | 2658972 | 8/1991 |
| RU | 2721549 | 5/2020 |
| WO | 2004042188 | 5/2004 |
| WO | 2007084763 | 7/2007 |
| WO | 2012067768 | 5/2012 |

* cited by examiner

EXTRACTION FROM A FORMATION WITH INDUCTION HEATING

CROSS-REFERENCE TO RELATED APPLICATION

This application is a National Stage of PCT/IB2021/053961, filed May 10, 2021, which claims the benefit of U.S. Provisional Patent Application No. 63/042,778, filed Jun. 23, 2020 and U.S. Provisional Patent Application No. 63/081,163, filed Sep. 21, 2020, which are incorporated by reference in their entireties.

BACKGROUND

Underground formations may include various substances that may be extracted and brought to the surface for other purposes. As an example, underground deposits may include oil and other hydrocarbons that can be refined into products for consumption, such as to provide energy or to manufacture plastics. Extraction of these deposits may be carried out in different manners depending on the conditions around the formation as well as the depth of the formation. In some instances, the hydrocarbon deposits in the formation include heavy oil and bitumen which do not flow as a liquid in its natural form. Accordingly, the hydrocarbon deposits may be removed via a mining process or liquefying the deposit so that it may flow or be pumped to the surface. In other instances the hydrocarbon deposits include heavy oil or paraffinic crude oil whose rate of flow may be increased through addition of heat effecting viscosity reduction or liberation of dissolved gases.

There are two common methods of liquefying a hydrocarbon substance. The first involves introducing a solvent or thinning agent, such as a light hydrocarbon, to effectively dissolve the heavy hydrocarbon deposit. The second method involves heating the hydrocarbon deposit. The manner by which the deposit is heated may involve steam injection to cause steam flooding, steam assisted gravity drainage (SAGD) or cyclical steam stimulation (CSS).

SUMMARY

In accordance with an aspect of the invention, an apparatus is provided. The apparatus includes a magnetic core to be inserted into a borehole drilled into a formation. The apparatus further includes a first coil wound about the magnetic core. In addition, the apparatus includes a first power supply to provide voltage that causes a first current to run through the first coil. The apparatus also includes a first controller to control the first power supply, wherein the first controller is to oscillate the first current to generate an oscillating magnetic field in the formation, and wherein heat is to be generated in the formation via electric currents induced to flow in the formation.

The magnetic core may be hollow.

The magnetic core may be cylindrical.

The magnetic core may be to guide wires therethrough.

The magnetic core may be to transport liquid from the formation to the surface.

The magnetic core may be to transport liquid from the surface to the formation for cooling the core and to improve electric conductivity of the formation.

The apparatus may further include an insulating layer to protect the magnetic core and the first coil.

The insulating layer may be fiberglass or other electrically non-conductive material of sufficient mechanical strength and temperature tolerance.

The first controller may include a switch, such as an inverter or other digital circuit, to oscillate the first current.

The apparatus may further include a capacitor to oscillate the first current.

The coil may include a positive conductor and a negative conductor separated by a dielectric along the conductive path of the coil to act as a capacitor.

The apparatus may further include a second coil wound about the magnetic core, wherein the second coil is electrically separated from the first coil.

The apparatus may further include a second power supply to provide voltage for a second current to run through the second coil. The apparatus may additionally include a second controller to control the second power supply. The second controller may be to oscillate the second current to increase the magnetic field in the formation.

In accordance with another aspect of the invention, an induction heating system is provided. The induction heating system includes a plurality of apparatuses described above. A subset of the plurality of apparatuses are arranged parallel to each other.

The subset of the plurality of apparatuses may be arranged in a circle.

Each apparatus of the subset may be equidistant from adjacent apparatuses along the circle.

The induction heating system may further comprise a ring within the circle.

The ring may be to support the subset of the plurality of apparatuses.

The ring may be electrically conductive to provide shielding for electronics.

The induction heating system may further include an electrically insulating covering, which is electrically non-conductive.

The insulating covering may be fiberglass or other suitable material.

BRIEF DESCRIPTION OF THE DRAWINGS

Reference will now be made, by way of example only, to the accompanying drawings in which.

DETAILED DESCRIPTION

As used herein, any usage of terms that suggest an absolute orientation (e.g. "top", "bottom", "up", "down", "left", "right", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Hydrocarbon deposits containing heavy oil and/or bitumen that does not easily flow generally uses heat, solvents or a combination of heat and solvents to extract hydrocarbon from a formation. Thermal methods often involve the using of large amounts of energy to generate the heat and steam to reduce the viscosity of the hydrocarbons in the formation so that it can be collected and removed via a production well. Accordingly, many in-situ thermal methods use two separate wells where one well is to reduce the viscously of the hydrocarbon material, and another well is for production purposes to remove the hydrocarbon material from the formation. Furthermore, thermal methods generally provide heat to the formation from a single location where the heat is to travel through the formation via thermal conduction and convection. Accordingly, such methods generate temperature profiles where the portions of the formation may not be heated to the same extent as the rest of the formation resulting in unrecovered hydrocarbons.

An apparatus to provide induction heating to a formation may be used to heat a hydrocarbon deposit in the formation via electromagnetic induction of electric currents in electrically conductive components to cause resistive heating in the formation. In particular, an electromagnet may be inserted into a borehole and used to generate an oscillating magnetic field which in turn will generate eddy currents in the electrically conducting material. Induction heating provides heat within the formation where the hydrocarbon deposit is located instead of relying on heat conduction from within the borehole and hot fluid injection. This provides contactless and/or targeted heating to reduce the viscosity of materials such as hydrocarbons in the formation without relying on heat conduction from the borehole or penetration of hot fluids. Furthermore, since heat is generated external to the borehole, it is possible to produce from the same borehole through the cylindrical cavity of the electromagnet located in that borehole. In some examples, production may be taken from a separate nearby borehole designed for producing fluids or other heated materials.

Figure 1:
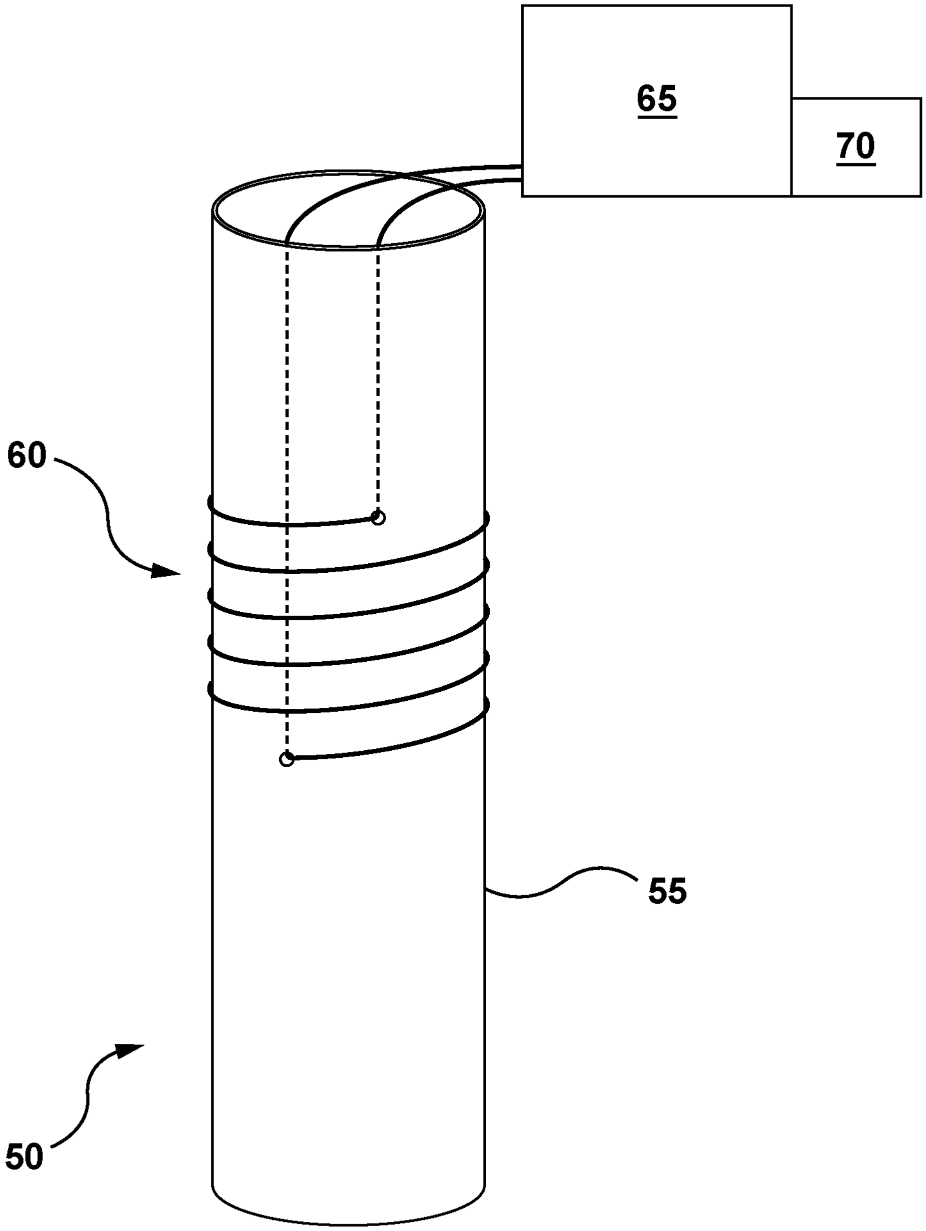
FIG. 1 is a schematic representation of the components of an example of an apparatus to heat a formation.

Referring to FIG. 1, a schematic representation of an apparatus 50 to heat an underground formation is generally shown. The apparatus 50 may include additional components, such as various additional interfaces and/or input/output devices such as indicators and sensors to interact with an operator of the apparatus 50 or other devices. The interactions may include viewing the operational status or updating operating parameters of the apparatus 50. In the present example, the apparatus 50 generates heat in an underground formation to facilitate and control the extraction of hydrocarbon materials. In other examples, the apparatus may be used to apply heat to other formations for other purposes, such as environmental remediation, process heating of sludge or tailings, and augmentation of oil recovery in open pit mines addressing otherwise inaccessible or deemed uneconomic resource including but not limited to stranded competitive lease boundary area resource, high fines oil sands ore, oil sands ore that fails to meet the minimum thickness affecting mining selectivity, oil sands ore with a total volume to bitumen in place (TV/BIP) ratio greater than a predetermined threshold for economic recovery by mining, and otherwise sterilized ore through use of shallow borings and drainage systems. The apparatus 50 may further include a communications interface to communicate with other devices, such as a central controller which may be at a remote location such that production from the apparatus 50 may be controlled remotely. In the present example, the apparatus 50 includes a magnetic core 55, a coil 60, a power supply 65, and a controller 70.

The magnetic core 55 is not particularly limited. In the present example, the magnetic core is made from a magnetically permeable material to be inserted into a borehole from the surface to a formation in which a hydrocarbon deposit is located. In the present example, the magnetic core 55 is a unitary hollow iron tube. In other examples, the magnetic core 55 may be assembled from multiple parts. In particular, the magnetic core 55 may be formed by stacking a plurality of toroidal rings of magnetic material. Furthermore, it is to be understood that the material from which the magnetic core 55 is formed is not limited and may include various alternative magnetic materials, such as ceramic magnetic materials.

The hollow center of the magnetic core 55 may be used to guide components through the borehole. For example, wires that may be used to power the coil 60 may enter the center cavity of the magnetic core 55 through openings. The wires may then be guided through the magnetic core and ultimately to the surface where the wires may be connected to a power supply. It is to be appreciated that by guiding the wires through the magnetic core 55, the wires may be protected from the harsher environments of the borehole. In other examples, an inverter disposed in the hollow magnetic core 55 may receive direct current (DC) power from the surface to improve power delivery efficiencies.

In other examples, the magnetic core 55 may be used to transport recovered materials from the formation, such as liquefied oil or reduced viscosity bitumen, therethrough. It is to be appreciated that in such examples, the apparatus 50 may be used as both a heating well and a production well.

Further variations of the apparatus are contemplated. As an example, the center of the magnetic core 55 may also be used to transport cooling fluids for electronic components. In further examples, the center of the magnetic core 55 may be used to inject fluid which may include additives to enhance electric conductivity near the borehole. In another example, electronics components, such as the power supply 65 and the controller 70 may be housed in the magnetic core 55.

Heat transport into an oil sands reservoir may be further improved by reinjection of produced water or supplemental make-up water concurrent with electromagnetic inductive heating of the near wellbore region. In this manner near wellbore electric conductivity may be maintained and vaporization of water may generate steam to enhance conductive and convective heat transfer into the reservoir.

Although the present example of the magnetic core 55 is in the form of a hollow tube, other examples may have a modified magnetic core 55 in other shapes and geometries. For example, the magnetic core 55 may be in the form of a solid rod. In further examples the magnetic core 55 may also have different shapes, such as a rectangular cross section.

The coil 60 is wound about the magnetic core 55. The coil 60 may include a wire wound about the magnetic core 55. For example, the coil 60 may be a copper wire. In other examples, the coil 60 may include a multi-stranded wire, Litz wire, enameled wire, or magnet wire. In other examples, the coil 60 may include wires made from other materials, such as platinum, silver, iron, aluminum, gold, or any combination thereof. The number of times the coil 60 is wound about the magnetic core 55 is not particularly limited and may be varied depending on the application. In particular, the number of windings may depend on the design of the apparatus 50 and the target magnetic field to pass through the formation. In the present example, the coil 60 includes five turns. However, in other examples, the coil 60 may include fewer than five turns, such as a single turn. Further examples may include more than five turns depending on the specific design and power requirements.

In the present example, the power supply 65 is to provide a current to run through the coil 60. The manner by which the power supply 65 provides the current is not particularly limited. For example, the power supply 65 may be a power source, such as DC power source, a battery, an electric generator, or a power point outlet.

The controller 70 is to control the current provided by the power supply 65 to provide an oscillating current to the coil 60. The manner by which the oscillating current is generated is not particularly limited. For example, the controller 70 may digitally oscillate a DC current from the power supply 65 with switches in some examples. In other examples, an electronic oscillator circuit such as a feedback oscillator or a negative-resistance oscillator may be used to oscillate the DC current. In further examples, the power supply 65 may use an alternating current (AC) current source which may be used directly on the coil.

It is to be appreciated that in some examples, the power supply 65 and the controller 70 may be combined in a single unit to supply an oscillating current to the coil 60. In the present example, the power supply 65 and the controller 70 are located on the surface and provide current to the coil via wires as shown in FIG. 1. In other examples, it is to be appreciated by a person with skill in the art with the benefit of this description that the power supply 65 and the controller 70 may also be disposed in the borehole closer to the coil.

The oscillating current in through the coil 60 is to generate an oscillating magnetic field where portions of the magnetic field penetrate through the formation. The oscillating magnetic field in turn generates heat in the formation by inducing eddy currents that generate heat in electrically conductive components in the formation via resistive heating in formation water (brine), shale and other strata containing electrically conductive materials, including minerals. Accordingly, since heat is generated within the electrically conductive components of the formation, the magnetic core 55 and the coil 60 are generally not significantly heated during use. Therefore, heat stress on components of the apparatus 50 is not significant when compared with heat stress caused by other electric heating methods where heat is generated within the borehole to be conducted into the formation.

In the present example, the magnetic core 55 and the coil 60 may be inserted into the borehole to the target location within a formation to receive an oscillating magnetic field to generate heat. The magnetic core 55 and the coil 60 may include a protective material or layer to protect the magnetic core 55 and the coil 60 during the insertion, removal, or movement process. For example, as the magnetic core 55 and the coil 60 are inserted into a borehole, the walls of the borehole may rub against the magnetic core 55 and the coil 60 to cause damage. Therefore, some examples may include an electrically non-conductive protective layer of insulating material around the magnetic core 55 and the coil 60. The insulating layer is not particularly limited and may be made from materials such fiberglass, epoxy, plastic, thermoplastics, ceramics, tempered glass, and chemically strengthened glass. In other examples, the magnetic core 55 and the coil 60 may be installed permanently during a borehole drilling operation. It is to be appreciated that a larger well tubular and larger size heating induction assemblies can be provided to improve access to the interior of the magnetic core 55 for production equipment and to increase heater power delivery capability. Furthermore, a larger heating induction assemblies power may improve the heating efficiency of the formation by the system.

In the present example, the magnetic core 55 extends beyond the wound length of the coil 60 to improve the magnetic circuit characteristics and the formation heating efficiency. By increasing the heating efficiency, it is to be appreciated by a person of skill in the art that the amount of input power used to increase the temperature of the formation by the same amount is reduced. It is to be appreciated by a person of skill in the art that by extending the magnetic core 55 further, the magnetic flux leakage is reduced to provide a longer return path through the formation to push heat penetration deeper into the formation. In other examples, the magnetic core 55 may not be extended as far beyond the coil 60 due to design considerations, such as space.

Figure 2:
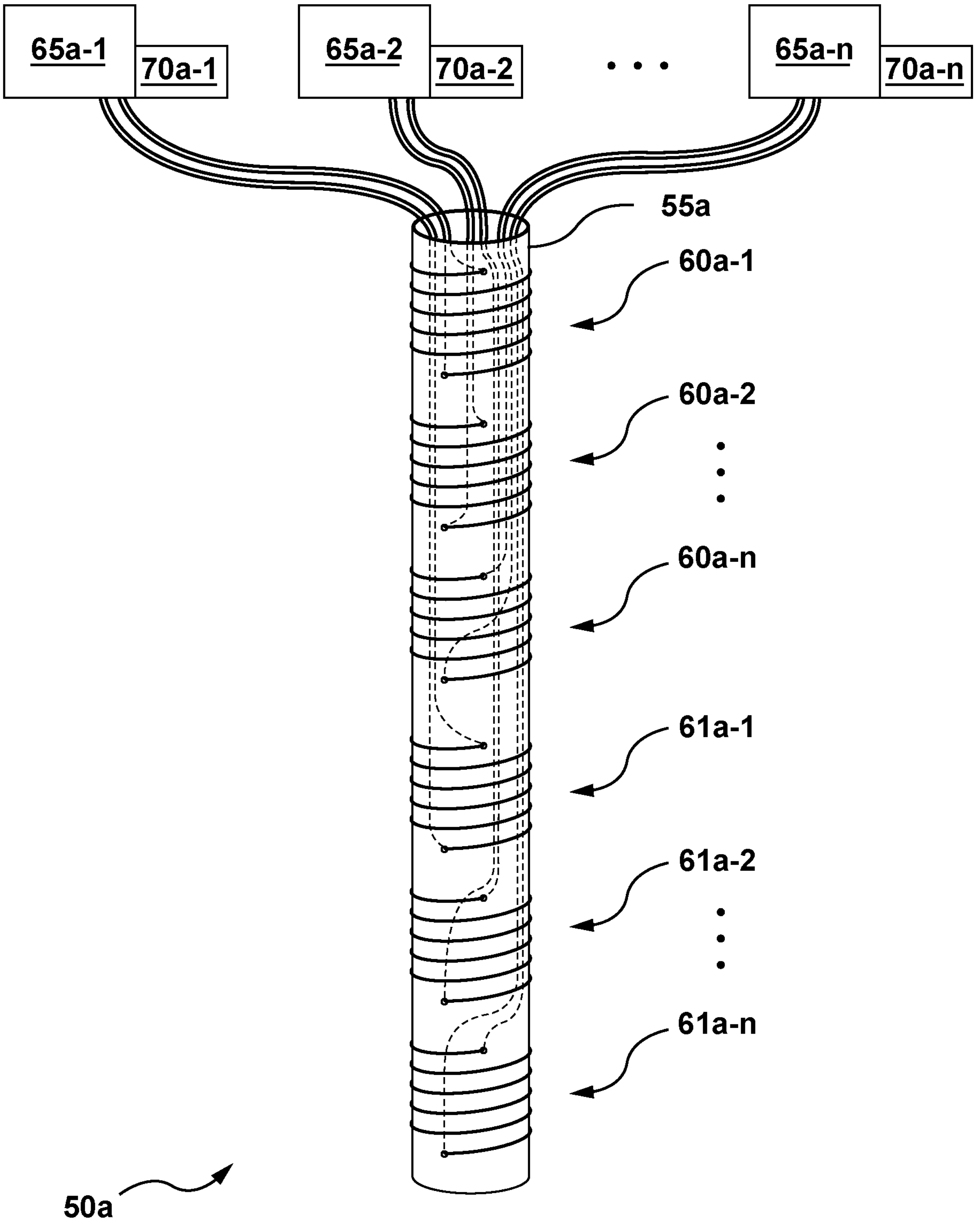
FIG. 2 is a schematic representation of the components of another example of an apparatus to heat a formation.

Referring to FIG. 2, another example of an apparatus 50*a* to heat an underground formation is provided. Like components of the apparatus 50*a* bear like reference to their counterparts in the apparatus 50, except followed by the suffix "a". In the present example, portions of the apparatus 50*a* may be inserted into a borehole from the surface to the underground formation, while other portions remain on the surface. The apparatus 50*a* includes a magnetic core 55*a*, a first plurality of coils 60*a*-1, 60*a*-2, . . . , 60*a*-*n* (generically, these coils are referred to herein as "coil 60*a*" and collectively they are referred to as "coils 60*a*"), a second plurality of coils 61*a*-1, 61*a*-2, . . . , 61*a*-*n* (generically, these coils are referred to herein as "coil 61*a*" and collectively they are referred to as "coils 61*a*"), a plurality of power supplies 65*a*-1, 65*a*-2, . . . , 65*a*-*n* (generically, these coils are referred to herein as "power supply 65*a*" and collectively they are referred to as "power supplies 65*a*"), and a plurality of controllers 70*a*-1, 70*a*-2, . . . , 70*a*-*n* (generically, these coils are referred to herein as "controller 70*a*" and collectively they are referred to as "controllers 70*a*").

In the present example, the coils 60*a* are electrically separated from each other and controlled by a separate controller 70*a* and power supply 65*a*. Similarly, the coils 61*a* are electrically separated from each other and controlled by a separate controller 70*a* and power supply 65*a*. Furthermore, although the coils 60*a* are electrically separated from each other, a coil from the plurality of coils 60*a* may be matched with a coil from the plurality of coils 61*a* to be controlled with a common controller 70*a* and power supply 65*a* connected in parallel as shown in FIG. 2.

In the present example, the coils 60*a* and 61*a* are configured to provide a substantially similar amount of magnetic flux. For example, a square wave of substantially similar current may be provided to the coils 60*a* and 61*a* having the same number of windings. In other examples with coils 60*a* and 61*a* having different numbers of windings or geometry, the current to each coil may be adjusted accordingly to provide a substantially similar magnetic flux. It is to be appreciated by a person of skill in the art with the benefit of this description that the number of power supplies 65*a* is not limited and that coils 60*a* and 61*a* may receive an oscillating current from other combinations of power supplies 65*a* and controllers 70*a*. Furthermore, it is to be understood that although the present example includes two groups of coils 60*a* and 61*a*, the apparatus 50*a* may be modified to include additional groups of coils to increase the magnetic field in the formation. Accordingly, the number of coils as well as the controllers 70*a* and power supplies 65*a* may be different such that some controllers 70*a* and power supplies 65*a* control more coils than others. For example, all of the coils shown in FIG. 2 may be controlled with a single power controller 70*a* and power supply 65*a*. By using different controllers 70*a* and power supplies 65*a*, the coils may be independently controlled. However, adding further controllers 70*a* along with additional power supplies 65*a* increases the complexity of the apparatus 50*a*.

In other examples, the coils 60*a* and 61*a* may be voltage driven such that the voltage across each coil 60*a* and 61*a* are the same. Accordingly, the current may vary slightly between the coils 60*a* and 61*a* as the impedance of each coil 60*a* and 61*a* may vary slightly.

Adding additional coils 60*a* and 61*a* around the magnetic core 55*a* may increase the magnetic field in the formation to enhance induction heating in the formation. For example, the apparatus 50*a* may be extended to a longer length to accommodate additional coils 60*a* and 61*a* along the greater length. In addition, dividing the coils along the length of the magnetic core 55*a* may provide a uniform magnetic field distribution along the magnetic core 55*a* and provide another flux return path in the formation compared with a single coil which may provide non-uniform field distribution and larger leakage flux.

Figure 3:
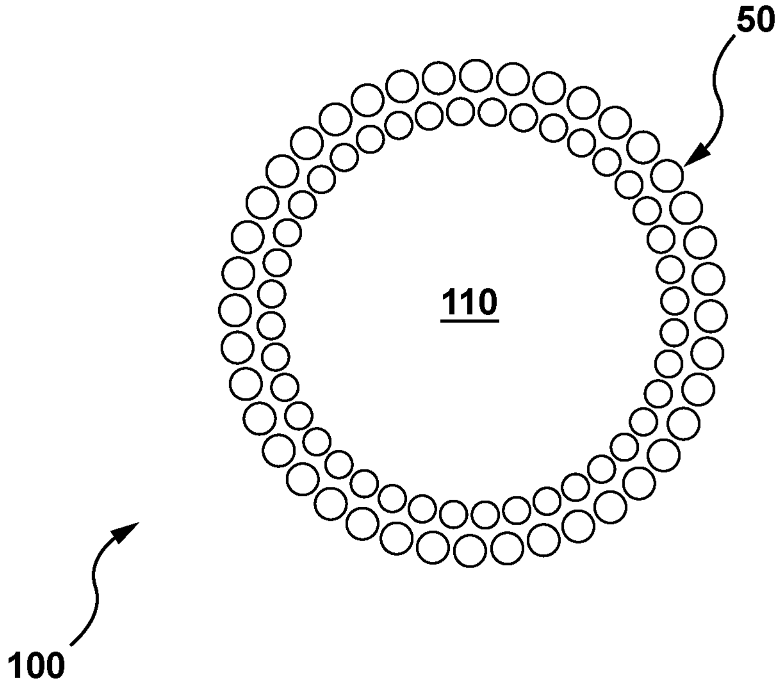
FIG. 3 is an end view of an example of an induction heating system including multiple apparatuses in concentric arrays.

Referring to FIG. 3, an end view of an induction heating system 100 with a plurality of apparatuses 50 is shown. The apparatuses 50 of the induction heating system 100 are generally arranged such that a plurality of the magnetic cores 55 of each apparatus 50 are disposed in a substantially parallel configuration within the borehole.

In the present example, the configuration of the magnetic cores 55 is substantially in the form of a circle or a plurality of concentric circles. In particular, each of the magnetic cores 55 may be spaced substantially equidistant from each other such that the magnetic field in the formation is uniform as it extends away from the borehole. In other examples, it is to be appreciated by a person of skill in the art with the benefit of this description that the geometry of the induction heating system 100 may be modified to adjust the magnetic field passing through specific portions of the formation to be targeted.

By arranging the apparatuses 50 in concentric circles, the hollow center portion 110 may be used to guide wires, or other production related pipes and tubing through the center of the induction heating system 100. Accordingly, the induction heating system 100 may be placed at any location within the borehole while allowing addition downhole equipment to continue operating. In particular, the induction heating system 100 may be placed around existing equipment in a borehole without significantly more space required. Since the apparatuses 50 are spaced apart as shown in FIG. 3, fluid may freely flow between the formation to the center portion 110. For example, after heating the formation, liquefied hydrocarbon deposits may flow into the center portion 110 to be collected and recovered to the surface using production equipment in the borehole.

Variations to the induction heating system 100 are contemplated. For example, although the induction heating system 100 is shown to include a plurality of apparatuses 50, it is to be understood that each of the apparatus 50 may be substituted with the apparatus 50*a*. As another example of a variation, the induction heating system 100 may include more or less apparatuses 50 than shown in FIG. 3.

Figure 4:
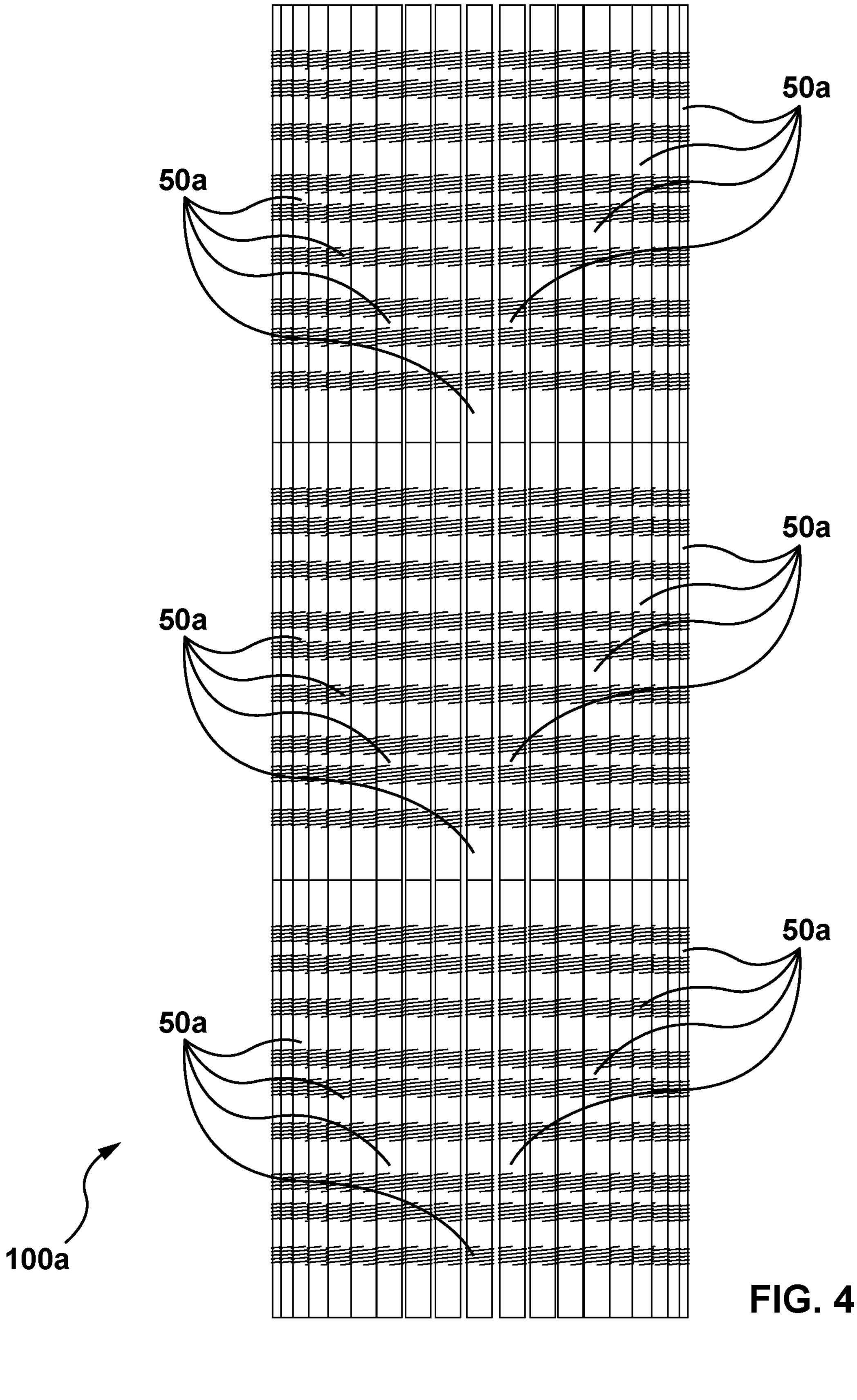
FIG. 4 is a side view of another example of an induction heating system including multiple apparatuses in stacked concentric arrays.

Referring to FIG. 4, another example of an induction heating system 100*a* with a plurality of apparatuses 50*a* is shown. In the present example, the induction heating system 100*a* includes a plurality of magnetic cores 55*a* aligned end to end as well as parallel to each other. By aligning the magnetic cores 55*a* end to end, flexibility is provided to the induction heating system 100*a* such that it may be inserted through a curve or bend in the borehole. In the present example, the induction heating system 100*a* is configured in a ring and may include a plurality of the induction heating system 100 shown in FIG. 3 stacked end to end. It is to be appreciated by a person of skill with the benefit of this description that by increasing the length, the induction heating system 100*a* may be inserted into a horizontal well to be positioned within the formation to provide a greater length of induction heating through the formation. In other examples, apparatuses 50*a* may be placed in multiple boreholes to achieve increased coverage of the formation.

In the present example, the apparatus 50*a* is substantially similar to the apparatus 50 described above. The number of apparatuses 50*a* used to form the induction heating system 100*a* is not particularly limited. In the present example, the induction heating system 100*a* includes 240 apparatuses 50*a*. However, the induction heating system 100*a* may be modified to have a larger center portion by increasing the number of apparatuses 50*a* in the perimeter. Alternatively, the additional apparatuses 50*a* may be added end to end to extend the length of the induction heating system 100*a*.

Figure 5:
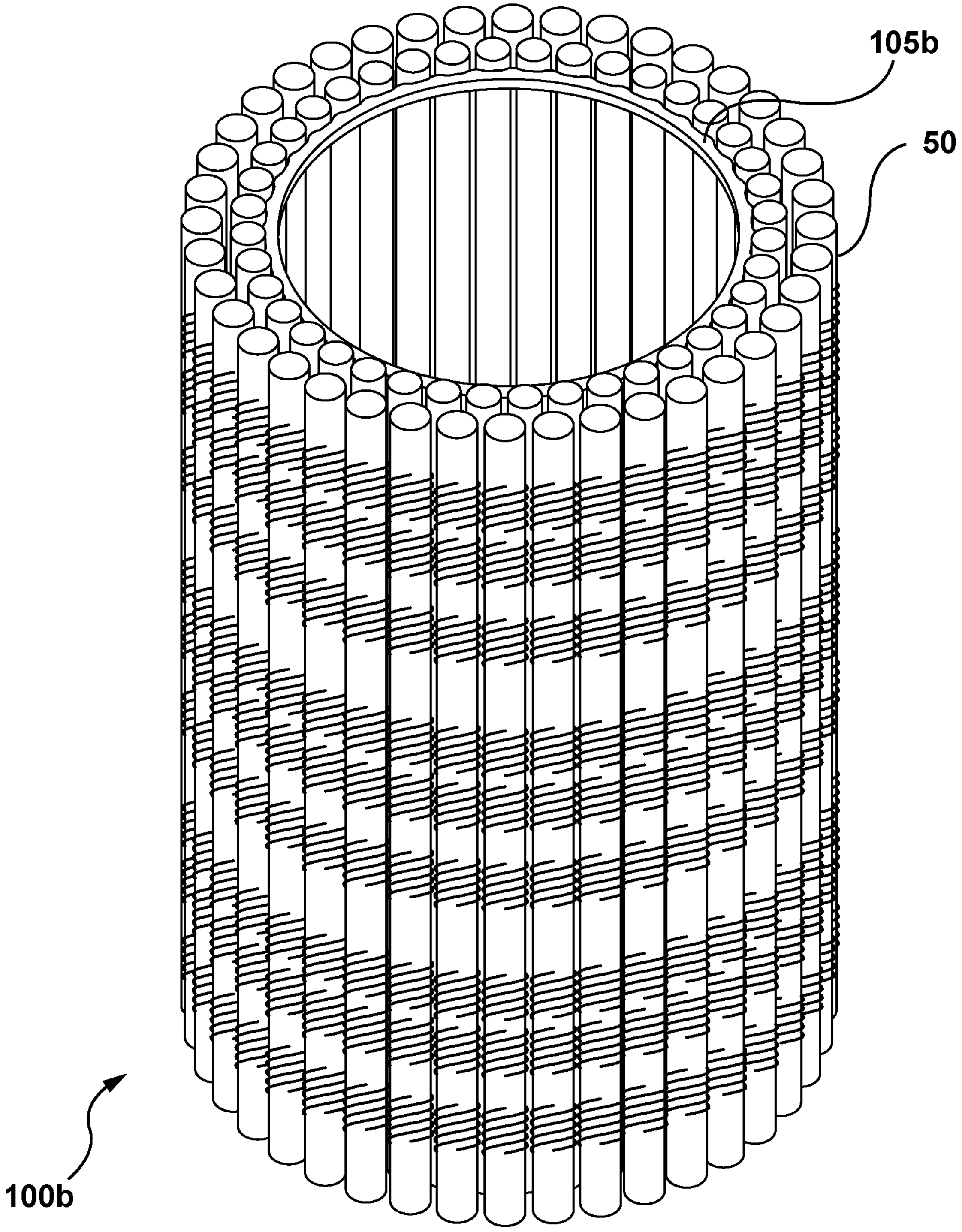
FIG. 5 is a perspective view of a portion of the induction heating system shown in FIG. 3.

Referring to FIG. 5, another example of an induction heating system 100*b* with a plurality of apparatus 50 is shown. Like components of the induction heating system 100*b* bear like reference to their counterparts in the induction heating system 100, except followed by the suffix "b". In the present example, the induction heating system 100*b* includes a ring 105*b* placed within the plurality of apparatuses 50. It is to be appreciated that the induction heating system 100*b* is not limited and may be use other apparatus, such as the apparatus 50*a* described above or a combination of different apparatuses.

The ring 105*b* is not particularly limited and may serve multiple functions in various examples. In one example, the ring 105*b* may be used to provide mechanical support to the apparatuses 50 to maintain their geometry. In the present example, the ring 105*b* maintains the geometry of the apparatuses 50 in the form of concentric circles. However, in other examples, the ring 105*b* may not be a ring and may be in the form of another shape, such as an oval, square, or other polygon to maintain the apparatuses 50 in another geometric configuration for inserting into a borehole. In particular, each apparatus 50 may be mounted directly to the ring 105*b* or indirectly to the ring 105*b* via another apparatus 50.

In some examples, the ring 105*b* may be an electrically conductive ring used to provide shielding to various utilities or electronics that may be placed in the center of the induction heating system 100*b*. In operation of the inductive heating system 100*b*, a current may be induced in the ring 105*b* to counteract the magnetic flux through the center portion of the induction heating system 100*b*. Accordingly, any sensitive equipment placed within the center portion of the inductive heating system 100*b* will be protected from any magnetic flux, such as a high frequency magnetic flux, that may damage or interfere with devices or transmission systems running through the inductive heating system 100*b*.

It is to be appreciated by a person of skill in the art with the benefit of this description that the ring 105*b* is not particularly limited to any material for shielding purposes. In the present example, the ring 105*b* is a copper ring. In other examples, the ring 105*b* may be made from another conductive material which facilitates the flow of induced currents in the ring. For example, materials such as aluminum, iron, or other electrically conductive materials may be used.

Figure 6:
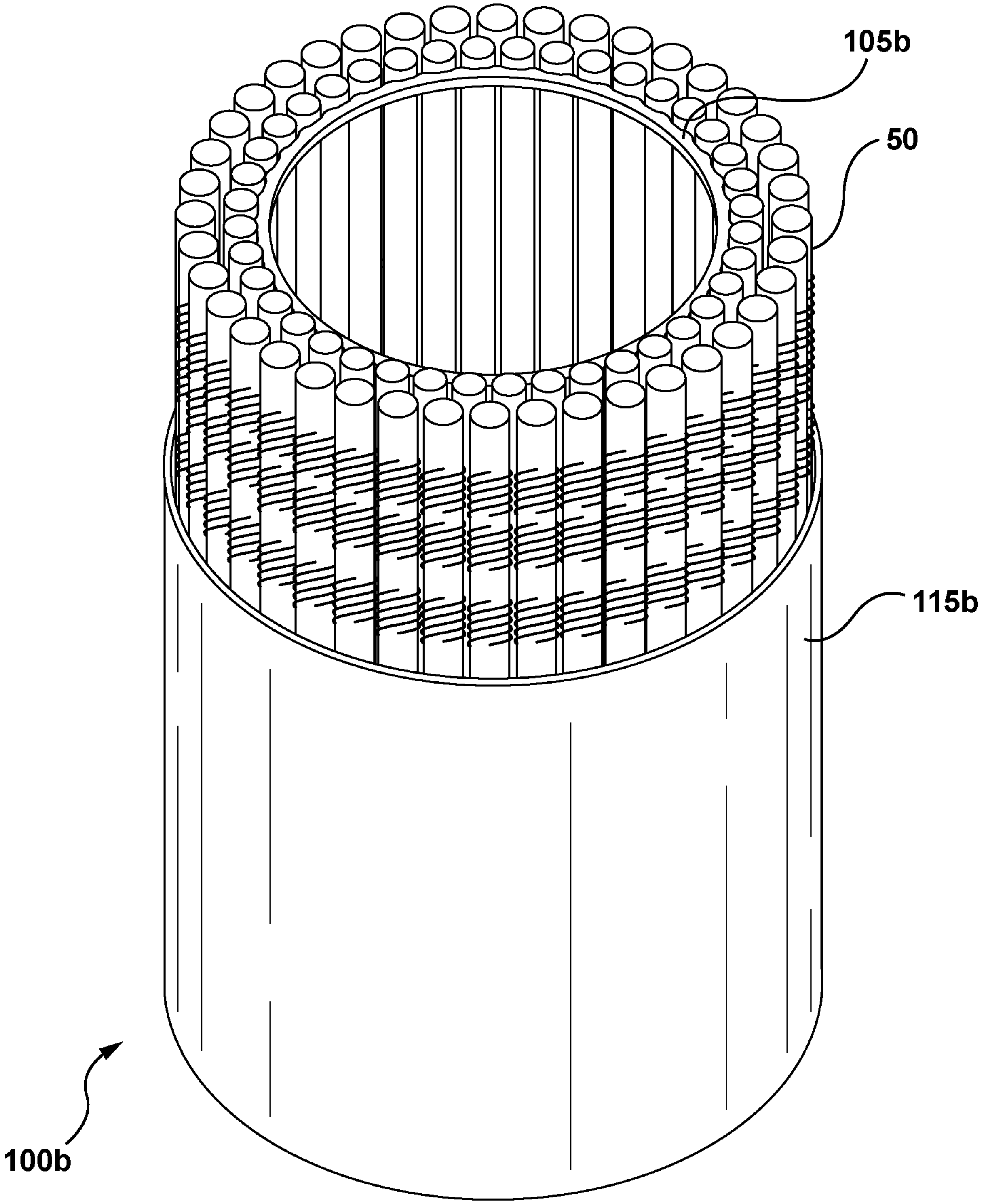
FIG. 6 is a perspective view of another portion of the induction heating system shown in FIG. 3.

Referring to FIG. 6, the induction heating system 100*b* may be protected with an external covering 115*b*. The external covering 115*b* is not particularly limited and may be manufactured from a suitable insulating material to allow the magnetic field to penetrate into the formation. It is to be appreciated by a person of skill in the art that the external covering 115*b* may be used to bind-the apparatuses 50 together against the ring 105*b*. The external covering may be made from a resin material, such as epoxy, fiberglass material, ceramics, thermoplastics, tempered glass, and/or chemically strengthened glass. This may provide additional mechanical support to protect the apparatuses 50 and especially the coils 60 disposed on each of the apparatus 50 as they are inserted into the borehole. In addition, the external covering 115*b* may also serve to reduce the chance of detachment of the apparatuses 50 from the ring 105*b*

Figure 7:
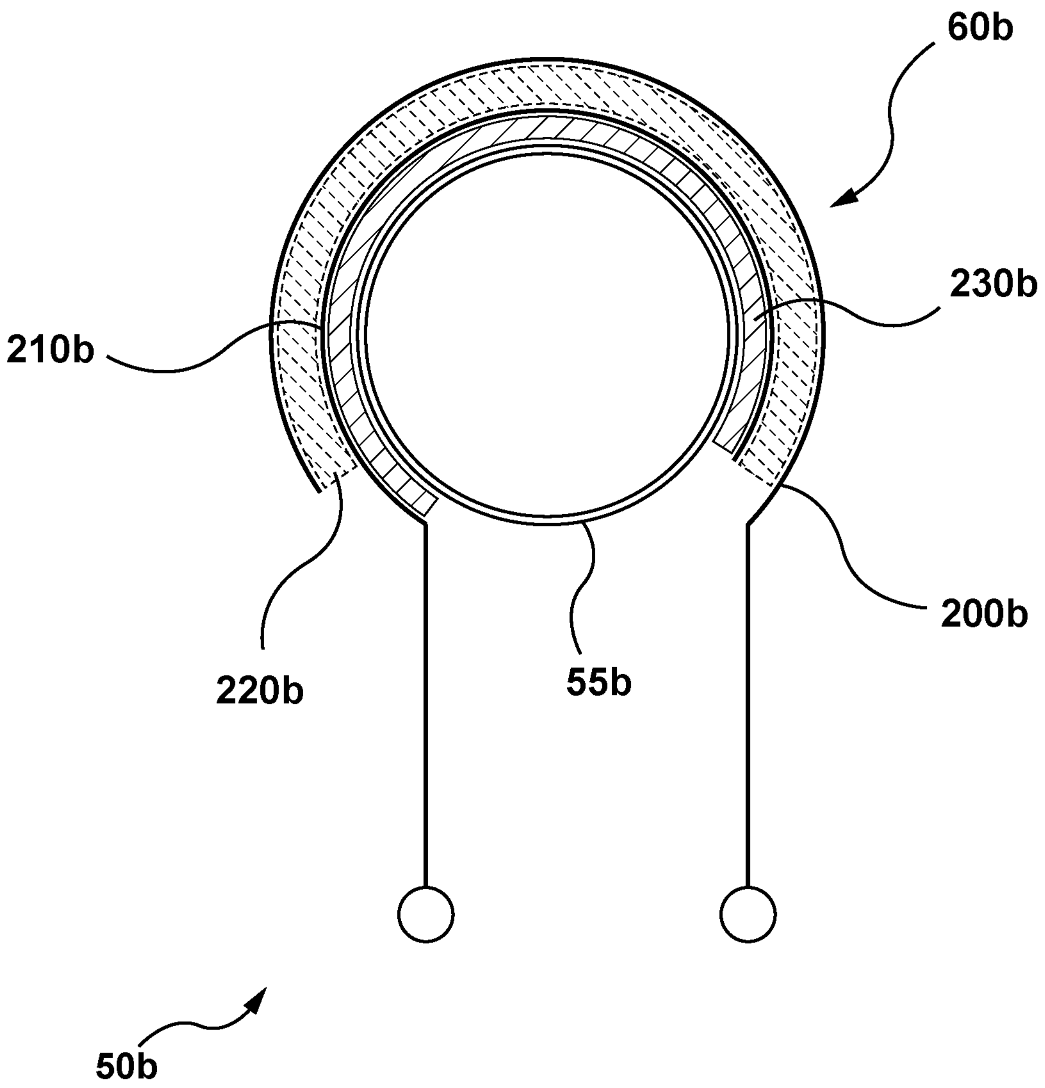
FIG. 7 is a cross sectional view of another example of an apparatus to heat a formation.

Referring to FIG. 7, another example of an apparatus 50*b* to heat an underground formation is provided. Like components of the apparatus 50*b* bear like reference to their counterparts in the apparatus 50, except followed by the suffix “b”. The apparatus 50*b* includes a magnetic core 55*b*, and a coil 60*b*.

In the present example, the coil 60*b* may be a foil type winding having a negative conductor 200*b* and a positive conductor 210*b* separated by a dielectric material 220*b* as shown in the cross section view in FIG. 7. The coil may also be separated from the magnetic core 55*b* with an insulating material 230*b*. In the present example, the insulating material 230*b* may be the same material as the dielectric material 220*b*. However, in other examples, different materials may be used. Furthermore, the insulating material 230*b* may surround the entire magnetic core 55*b* in some examples, such as a coating. It is to be appreciated by a person of skill in the art with the benefit of this description while the coil 60*b* may act as an inductor with a single winding, the negative conductor 200*b* and the positive conductor 210*b* separated by a dielectric material 220*b* may have a capacitance and act as a capacitor. Accordingly, the apparatus 50*b* inherently may include a resonant load circuit, such as an RLC circuit, that can act as an electronic oscillator without using a separate capacitor in series. Accordingly, the current supplied to the coil 60*b* can be oscillated in a sinusoidal manner instead of using a separate switch, which may introduce additional losses in the system.

Figure 8:
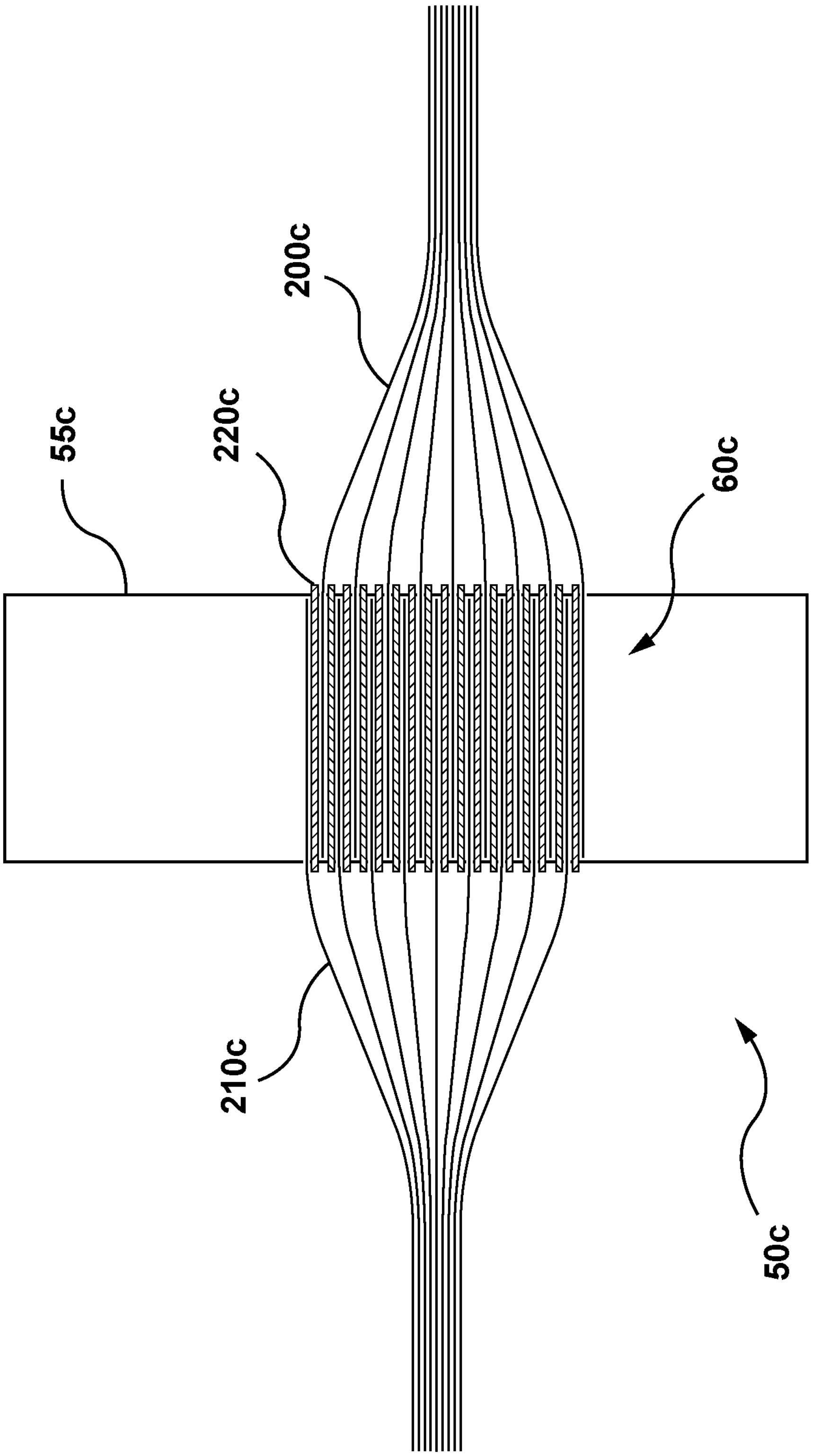
FIG. 8 is a profile view of the example of an apparatus to heat a formation shown in FIG. 7.

Referring to FIG. 8, another example of an apparatus 50*c* to heat an underground formation is provided. Like components of the apparatus 50*c* bear like reference to their counterparts in the apparatus 50, except followed by the suffix “c”. The apparatus 50*c* includes a magnetic core 55*c*, and a coil 60*c*.

In the present example, the coil 60*c* may include bundles of a negative conductor 200*c* and bundles of a positive conductor 210*c* separated by a dielectric material 220*c* to form capacitor plates around the magnetic core 55*c*. In the present example, the bundles of negative conductor 200*c* and the bundles of positive conductor 210*c* may be twisted, distributed randomly, or in any relationship to control the high frequency performance of the coil 60*c* as well as the capacitance value of the coil 60*c*. Similar to the apparatus 50*b*, the apparatus 50*c* inherently may include a resonant load circuit, such as an RLC circuit, that can act as an electronic oscillator. Accordingly, the current supplied to the coil 60*c* can be oscillated in a sinusoidal manner instead of using a separate switch, which may introduce additional losses in the system.

Furthermore, it is to be appreciated by a person of skill in the art that multiple coils 60*c* may be connected in series to provide a higher total voltage.

Referring to FIGS. 9 to 14, results from a mutliphysics simulation of the heating of a formation with a typical resistivity is shown. The induction heating multiphysics interface, which includes a magnetic fields and a heat transfer interface, is used to model induction heating of the oil sands. The electromagnetic power dissipation is the heat source in the coupled multiphysics and the oil sands domain material properties depend on temperature. Maxwell’s equations are solved in the magnetic fields interface to compute the induced currents and the electromagnetic loss density at a specified voltage and frequency excitation. The electromagnetic loss density from the magnetic fields interface is then coupled to the heat transfer interface as the heat source to estimate the temperature distribution in the oil sands domain. This process is performed iteratively over a defined heating period.

The resistivity of the oil sands is updated after each time step according to a linear relationship with the temperature computed at the previous time step. Accordingly, the simulation accurately predicts the magnetic field distribution, power dissipation, and temperature distribution at any given input voltage and operating frequency.

Figure 9:
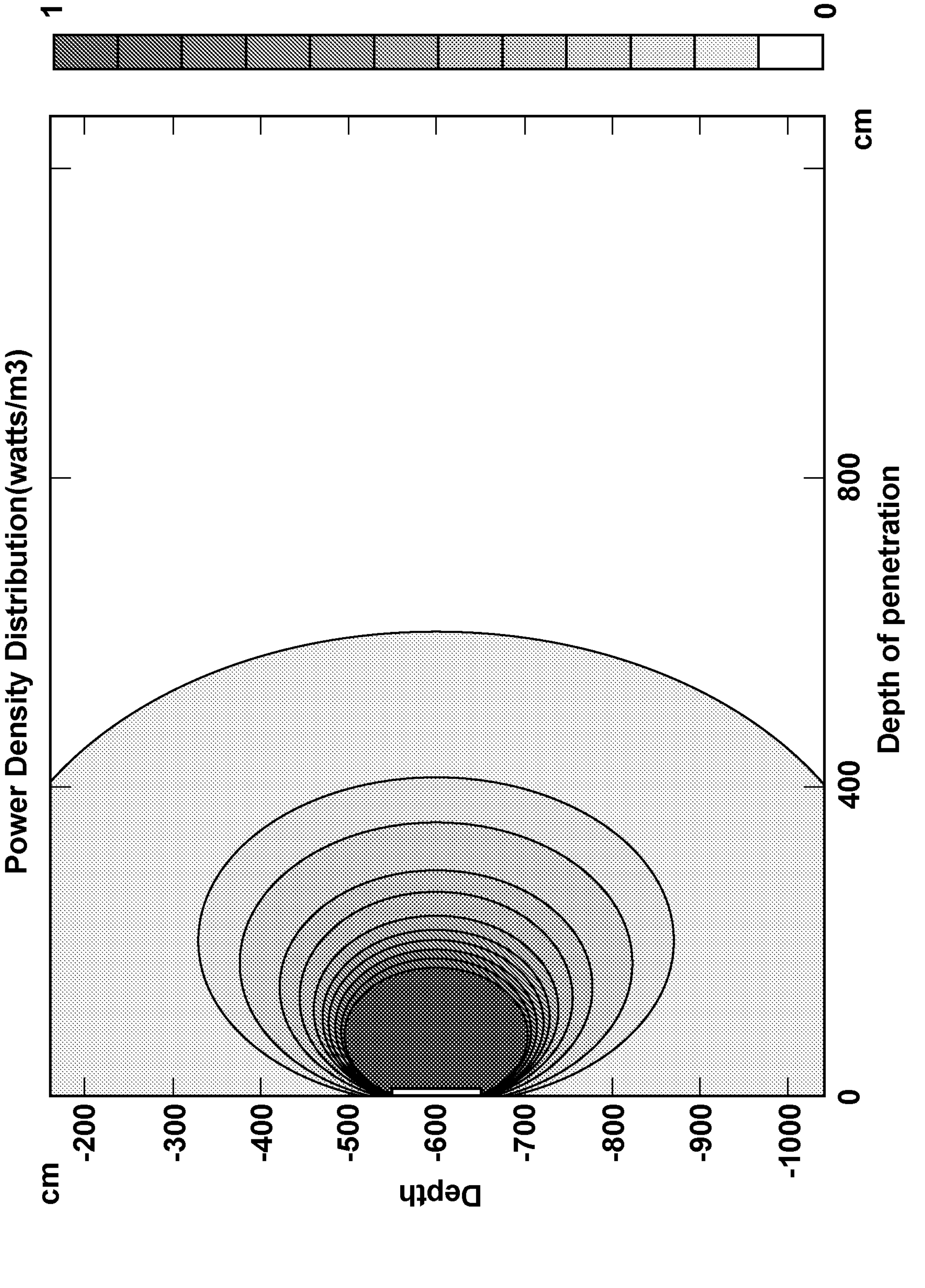
FIG. 9 is a figure to show a simulated power density distribution in the oil sands domain.
Figure 10:
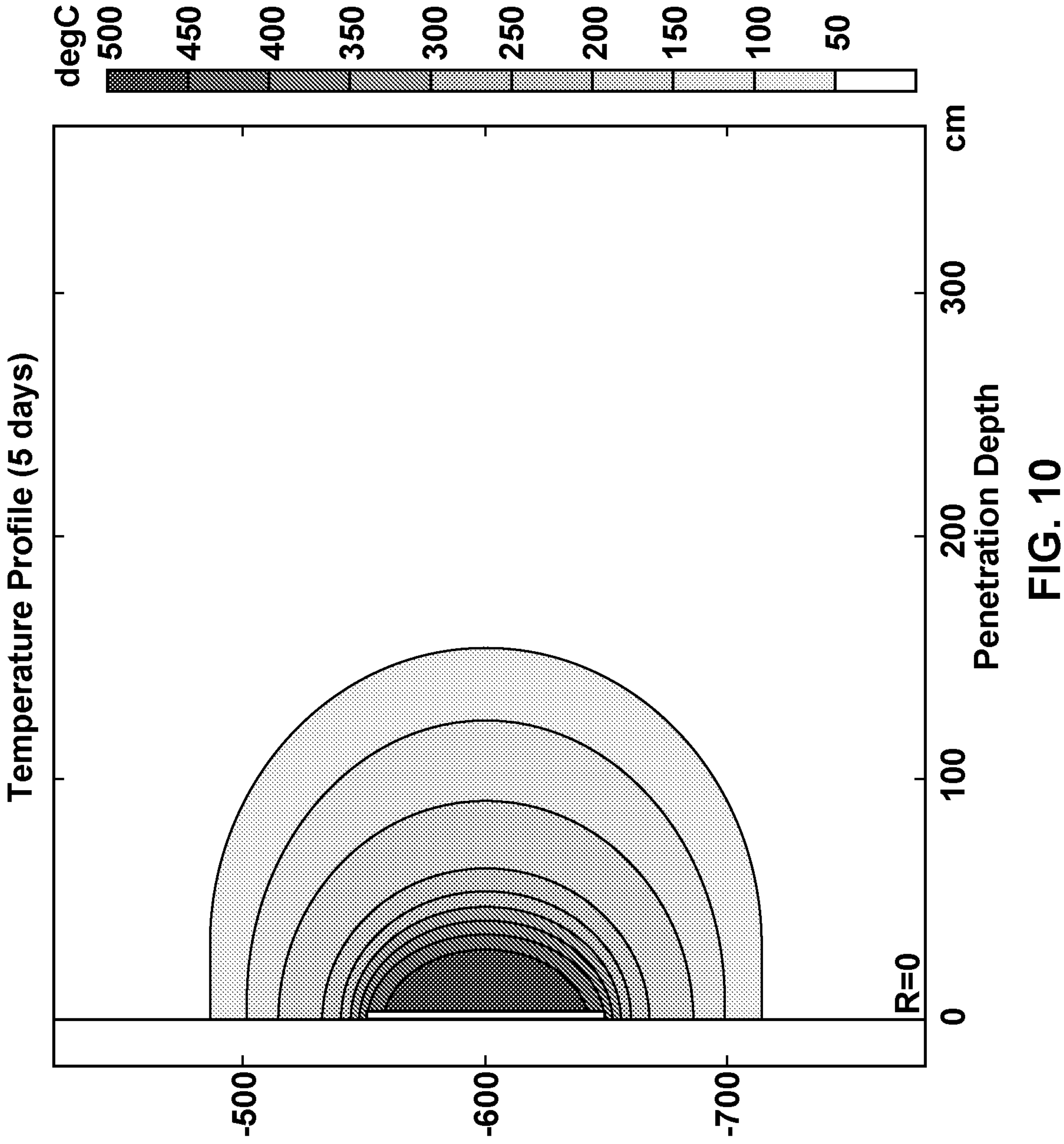
FIG. 10 is a figure to show a simulated temperature distribution in the oil sands domain.
Figure 11:
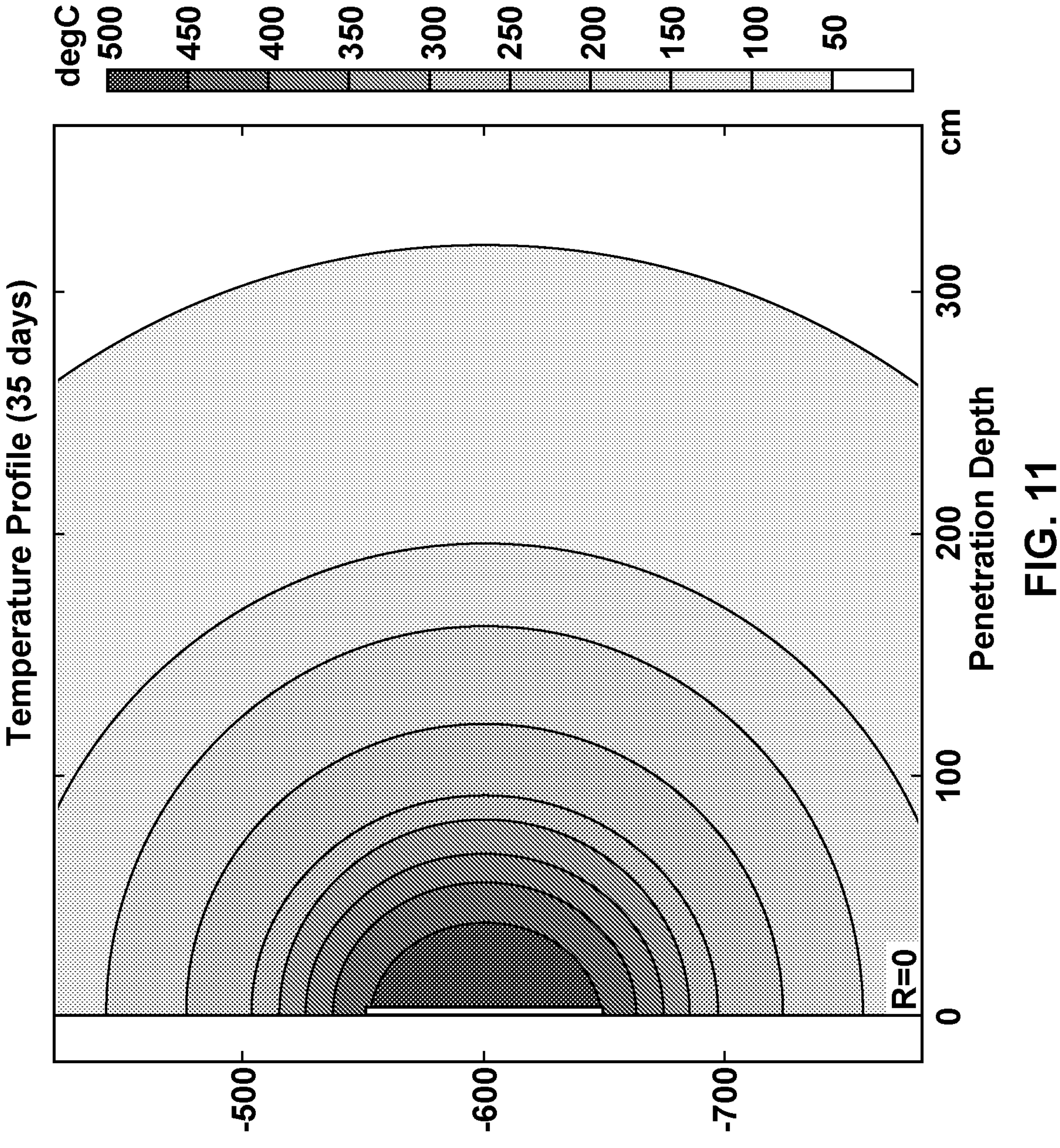
FIG. 11 is a figure to show another simulated temperature distribution in the oil sands domain.
Figure 12:
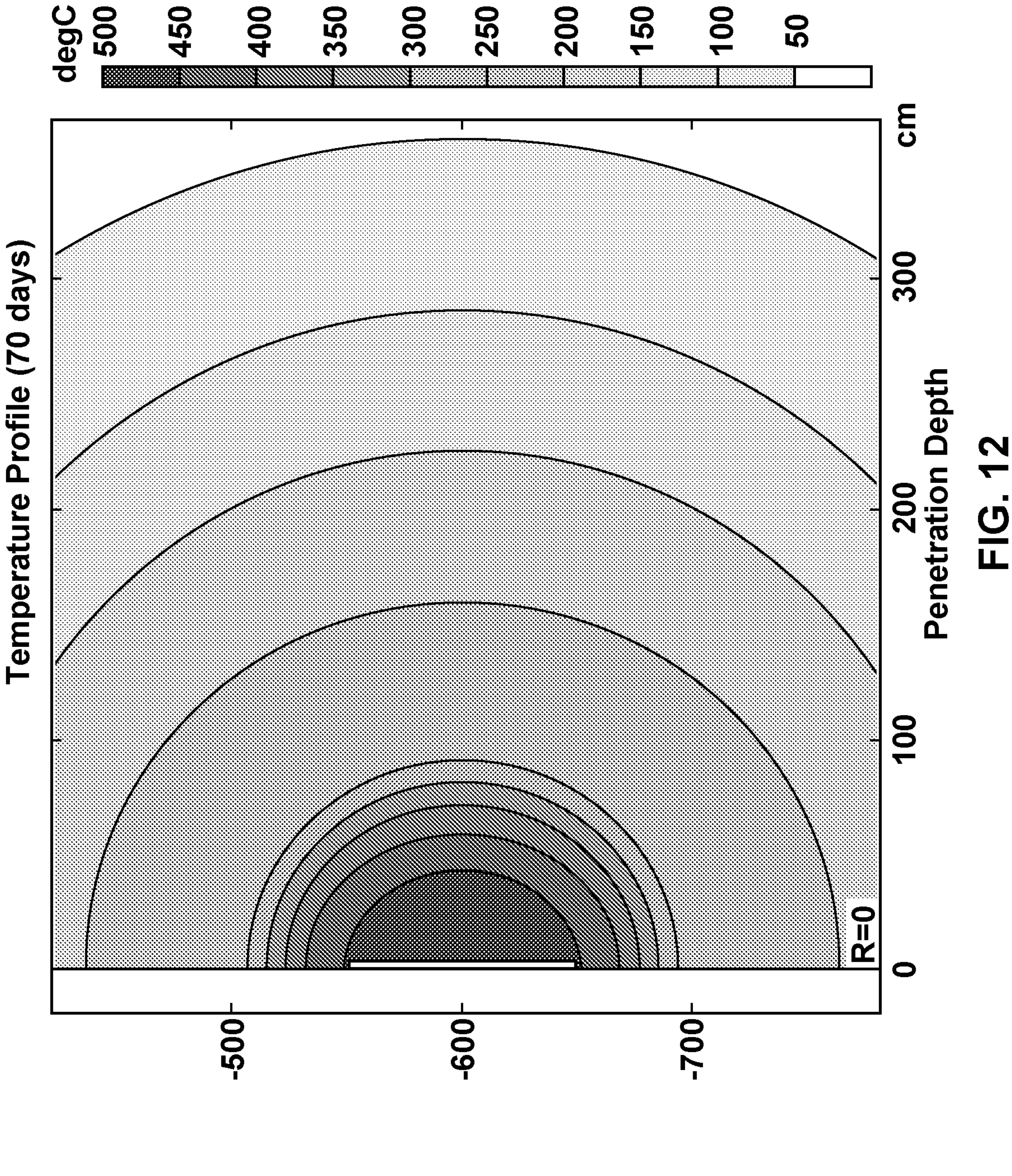
FIG. 12 is a figure to show another simulated temperature distribution in the oil sands domain.
Figure 13:
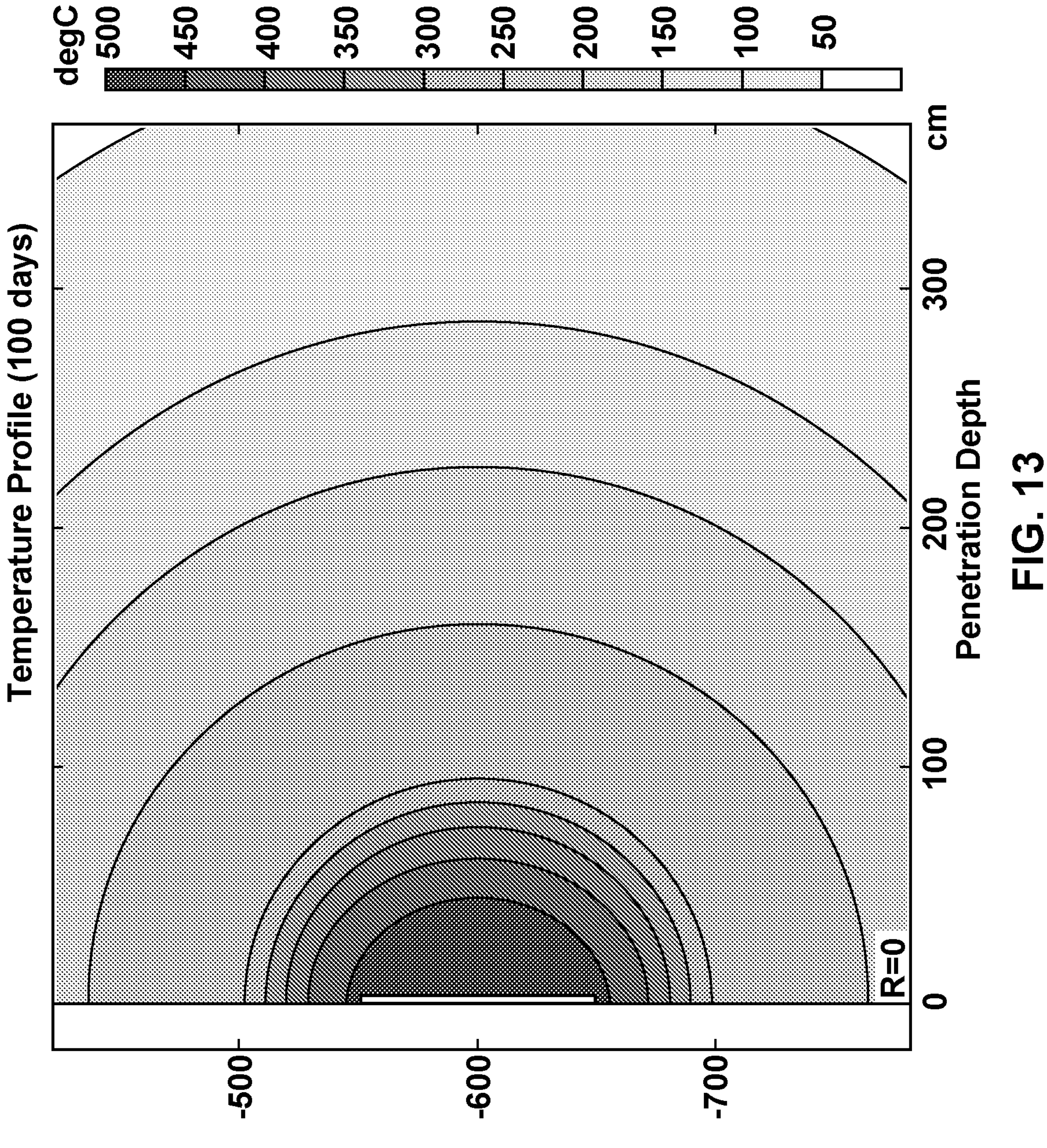
FIG. 13 is a figure to show another simulated temperature distribution in the oil sands domain.
Figure 14:
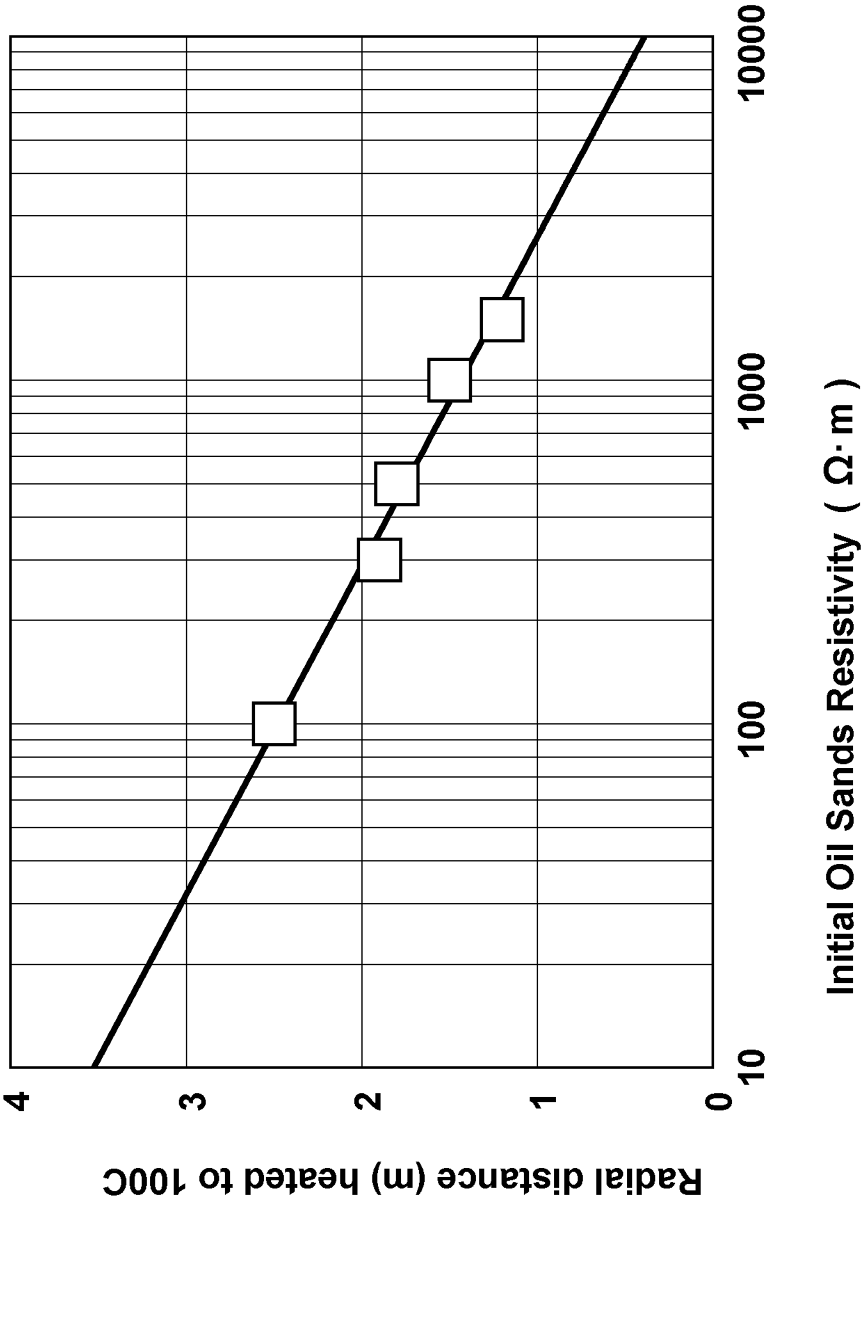
FIG. 14 is a figure to show a simulated plot of the radial distance heated to a temperature.

As a result, FIG. 9 shows the power density distribution in the oil sands domain for a 300 Ω·m oil sands domain at 1 Megahertz. FIGS. 10, 11, 12, and 13 show the temperature profiles for a 300 Ω·m oil sands domain at 1 Megahertz after 5, 35, 70 and 100 days of heating respectively. FIG. 14 is a plot of the radial distance heated to 100° C. versus initial resistivity of the oil sands domain. This is the boiling temperature for water at atmospheric pressure and for underground steam generation a higher temperature is used as the boiling temperature will rise with the increase of pressure.

It should be recognized that features and aspects of the various examples provided above may be combined into further examples that also fall within the scope of the present disclosure.

What is claimed is:

1. An apparatus comprising:
- a magnetic core to be inserted into a borehole to a formation;
- a first coil wound about the magnetic core;
- a first current supply to generate a first current to run through the first coil; a first controller to control the first current supply, wherein the first controller is to oscillate the first current to generate a magnetic field in the formation, and wherein heat is to be generated in the formation via induction; and a capacitor to oscillate the first current, wherein the first coil includes a positive conductor and a negative conductor separated by a dielectric along a conductive path of the first coil.

2. The apparatus of claim 1, wherein the magnetic core is hollow.

3. The apparatus of claim 2, wherein the magnetic core is to guide wires therethrough.

4. The apparatus of claim 2, wherein the magnetic core is to transport liquid from the formation.

5. The apparatus of claim 1, further comprising an insulating layer to protect the magnetic core and the first coil.

6. The apparatus of claim 5, wherein the insulating layer is fiberglass.

7. The apparatus of claim 1, wherein the first controller includes a switch to oscillate the first current.

8. The apparatus of claim 1, further comprising a second coil wound about the magnetic core, wherein the second coil is electrically separated from the first coil.

9. The apparatus of claim 8, further comprising:

a second current supply to generate a second current to run through the second coil; and a second controller to control the second current supply, wherein the second controller is to oscillate the second current to increase the magnetic field in the formation.

10. An induction heating system comprising a plurality of apparatuses, wherein a subset of the plurality of apparatuses are arranged parallel to each other, and wherein each apparatus comprises:

a magnetic core to be inserted into a borehole to a formation;

a first coil wound about the magnetic core;

a first current supply to generate a first current to run through the first coil;

a first controller to control the first current supply, wherein the first controller is to oscillate the first current to generate a magnetic field in the formation, and wherein heat is to be generated in the formation via induction; and a capacitor to oscillate the first current, wherein the first coil includes a positive conductor and a negative conductor separated by a dielectric along a conductive path of the first coil.

11. The induction heating system of claim 10, wherein the subset of the plurality of apparatuses is arranged in a circle.

12. The induction heating system of claim 11, wherein each apparatus of the subset is equidistant from adjacent apparatuses along the circle.

13. The induction heating system of claim 11, further comprising a ring within the circle.

14. The induction heating system of claim 13, wherein the ring is to support the subset of the plurality of apparatuses.

15. The induction heating system of claim 13, wherein the ring is conductive to provide shielding for electronics.

16. The induction heating system of claim 10, further comprising an insulating covering.

17. The induction heating system of claim 16, wherein the insulating covering is fiberglass.

* * * * *